United States Patent
Matsuyama et al.

(10) Patent No.: US 10,659,165 B2
(45) Date of Patent: May 19, 2020

(54) OPTICAL TRANSMISSION DEVICE

(71) Applicant: NEC Corporation, Tokyo (JP)

(72) Inventors: Yurie Matsuyama, Tokyo (JP); Takefumi Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/078,912

(22) PCT Filed: Feb. 21, 2017

(86) PCT No.: PCT/JP2017/006387
§ 371 (c)(1),
(2) Date: Aug. 22, 2018

(87) PCT Pub. No.: WO2017/150277
PCT Pub. Date: Sep. 8, 2017

(65) Prior Publication Data
US 2019/0058526 A1     Feb. 21, 2019

(30) Foreign Application Priority Data
Feb. 29, 2016    (JP) .................................. 2016-038162

(51) Int. Cl.
*H04J 14/02*     (2006.01)
*H04B 10/27*    (2013.01)
(Continued)

(52) U.S. Cl.
CPC ............. *H04B 10/27* (2013.01); *H04B 10/50* (2013.01); *H04J 14/02* (2013.01); *H04Q 11/0062* (2013.01)

(58) Field of Classification Search
CPC .... H04J 14/02; H04J 14/0282; H04J 14/0265; H04J 14/0278; H04J 14/0238;
(Continued)

(56) References Cited

U.S. PATENT DOCUMENTS 7,437,074 B2 * 10/2008 Nakamura .............. H04J 14/02
398/201
7,796,887 B2 * 9/2010 Terahara ................. H04J 14/02
398/26
(Continued)

FOREIGN PATENT DOCUMENTS

CN      102790653 A      11/2012
EP      2 426 841 B1      1/2019
(Continued)

OTHER PUBLICATIONS

JP2006025224 Machine Translation (Year: 2006).*
(Continued)

*Primary Examiner* — Hibret A Woldekidan
(74) *Attorney, Agent, or Firm* — Finnegan, Henderson, Farabow, Garrett & Dunner, L.L.P.

(57) ABSTRACT

[Problem] To provide an optical transmission device that, while suppressing band narrowing due to optical filters, achieves flexibility of optical communication such as wavelength reutilization and that supports a flexible grid.

[Solution] An optical transmission device according to the present invention is provided with a cyclic AWG that filters respective optical signals inputted to each input port. The respective optical signals are constituted so that a plurality of wavelength-multiplexed signals can be allocated within one channel band, the respective optical signals are filtered in channel units, and the pass-band width of each of the input ports of the cyclic AWG corresponds to the bandwidth of a channel.

13 Claims, 9 Drawing Sheets

(51) Int. Cl.
*H04B 10/50* (2013.01)
*H04Q 11/00* (2006.01)

(58) Field of Classification Search
CPC ....... H04J 14/028; H04B 10/27; H04B 10/50; H04B 10/272; H04Q 11/0062; H04Q 2011/0009; H04Q 2011/0016; G02B 6/2938; G02B 6/29389
USPC .............................. 398/58, 68–70, 79, 87, 85
See application file for complete search history.

(56) References Cited

U.S. PATENT DOCUMENTS

| | | | | |
|---|---|---|---|---|
| 8,095,011 B2 * | 1/2012 | Yano | .................... | H04J 14/0204 398/79 |
| 8,958,695 B2 * | 2/2015 | Ooi | .................... | H04J 14/0208 398/52 |
| 8,965,202 B2 * | 2/2015 | Sone | ................ | H04B 10/07955 398/38 |
| 2004/0208428 A1 * | 10/2004 | Kikuchi | ............. | G02B 6/29358 385/24 |
| 2007/0133632 A1 * | 6/2007 | Doerr | ...................... | H01S 5/026 372/30 |
| 2008/0129982 A1 * | 6/2008 | Nakamura | ........... | G01M 11/083 356/73 |
| 2013/0094853 A1 * | 4/2013 | Mizutani | .............. | G02B 6/2938 398/34 |
| 2013/0136447 A1 * | 5/2013 | Cavaliere | ............ | H04J 14/0282 398/49 |
| 2013/0170787 A1 * | 7/2013 | Nagarajan | ............ | H04B 10/506 385/14 |
| 2013/0322883 A1 * | 12/2013 | Dahlfort | ............ | H04J 14/0209 398/84 |
| 2019/0064437 A1 * | 2/2019 | Matsuyama | ............ | H04J 14/02 |

FOREIGN PATENT DOCUMENTS

| | | | | |
|---|---|---|---|---|
| JP | 2005-3832 A | | 1/2005 | |
| JP | 2006-25224 | | 1/2006 | |
| JP | 2006025224 A | * | 1/2006 | ............. H04J 14/02 |
| JP | 2007-208342 | | 8/2007 | |
| JP | 2015-19289 | | 1/2015 | |

OTHER PUBLICATIONS

International Search Report dated May 9, 2017, in corresponding PCT International Application.
Shin Kamei et al., "N x N Cyclic-Frequency Router With Improved Perfomance Based on Arrayed-Waveguide Grating", Journal of Lightwave Technology, Sep. 15, 2009, vol. 27, No. 18, pp. 4097-4104 (Sep. 15, 2009).
Notification of First Office Action dated Aug. 27, 2019, issued by the China National Intellectual Property Administration in counterpart Chinese Patent Application No. 201780013625.3.
Office Action issued by the Japanese Patent Office in corresponding application No. JP 2018-503057, dated May 14, 2019.

* cited by examiner

OPTICAL TRANSMISSION DEVICE

CROSS-REFERENCE TO RELATED PATENT APPLICATIONS

This application is a National Stage Entry of International Application No. PCT/JP2017/006387, filed Feb. 21, 2017, which claims priority from Japanese Patent Application No. JP 2016-038162, filed Feb. 29, 2016. The entire contents of the above-referenced applications are expressly incorporated herein by reference.

TECHNICAL FIELD

The present invention relates to an optical transmission device, and particularly relates to an optical transmission device used in an optical communication network.

BACKGROUND ART

In association with an increase in demand for a wideband multimedia communication service, such as the Internet and image distribution, introduction of an optical fiber communication system that covers a long distance and that has a large capacity has been progressing in trunk line networks and metro access networks. In such an optical communication system using optical fibers, it is important to increase transmission efficiency per optical fiber. For this reason, wavelength division multiplex (WDM) communication, in which a plurality of optical signals having different wavelengths are multiplexed and transmitted, are widely used.

Optical transmission devices are required to perform transmission over a longer distance than that conventionally covered and to have operational flexibility because of an increase in information communication traffic in recent years, and research and development in elastic optical technology has been conducted.

PTL 1 and NPL 1 disclose technologies relating to optical transmission devices that are capable of autonomously changing a pass band for optical signals while being in operation in an optical network using a WDM technology.

CITATION LIST

Patent Literature

[PTL 1] JP 2015-19289 A

Non Patent Literature

[NPL 1] Shin Kamei et al., "N×N Cyclic-Frequency Router With Improved Perfomance Based on Arrayed-Waveguide Grating", JOURNAL OF LIGHTWAVE TECHNOLOGY, Sep. 15, 2009, VOL. 27, NO. 18, p 4097-4104

SUMMARY OF INVENTION

Technical Problem

As described in the background art, an optical transmission device used in an optical communication network is required to perform long distance transmission and to have operational flexibility. For example, a colorless, directionless and contentionless reconfigurable optical add drop multiplexer (CDC-ROADM) is a system having high flexibility. However, the CDC-ROADM has a problem in that use of a wavelength selective switch (WSS) causes the number of optical filters to be passed per node to increase, influence of band narrowing due to optical filters to increase, and transmission characteristics to deteriorate.

Although methods to solve the problem relating to operational flexibility include a configuration disclosed in NPL 1, the configuration cannot solve the above-described problem relating to band narrowing. In addition, there is a problem in that the configuration is incapable of supporting a flexible grid, which is indispensable for achieving an elastic network.

In consideration of the above-described problems, an object of the present invention is to provide an optical transmission device that, while suppressing optical signals from being trimmed because of band narrowing due to optical filters, achieves flexibility of optical communication such as wavelength reutilization and that supports a flexible grid.

Solution to Problem

An optical transmission device according to the present invention includes a cyclic AWG that filters respective optical signals inputted to each input port. The respective optical signals are constituted so that a plurality of wavelength-multiplexed signals can be allocated within one channel band, the respective optical signals are filtered in channel units, and the pass-band width of each of the input ports of the cyclic AWG corresponds to the bandwidth of the channel.

Advantageous Effects of Invention

The invention enables an optical transmission device to be provided that, while suppressing optical signals from being trimmed because of band narrowing due to optical filters, achieves flexibility of optical communication such as wavelength reutilization and that supports a flexible grid.

EXAMPLE EMBODIMENT

Hereinafter, example embodiments of the present invention will be described with reference to the drawings.

Figure 1:
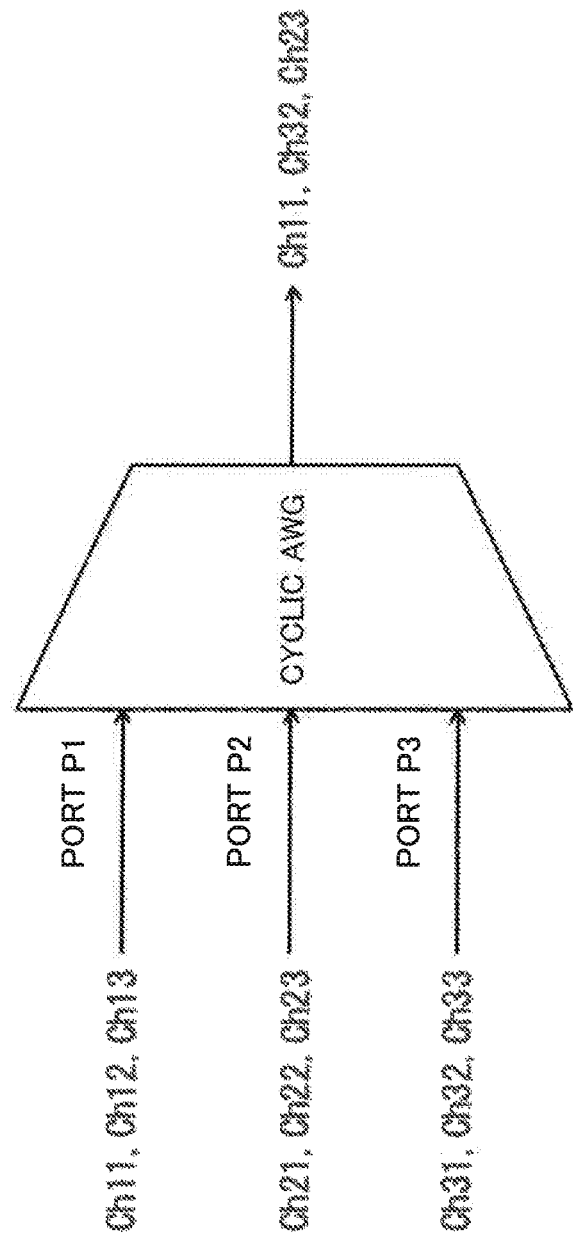
FIG. 1 is a diagram for a description of an outline of an optical transmission device according to the present invention.

First, an outline of the example embodiments of the present invention will be described. FIG. 1 is a diagram for a description of an outline of an optical transmission device according to each example embodiment. As illustrated in FIG. 1, the optical transmission device according to each example embodiment includes a cyclic arrayed waveguide grating (AWG) that filters respective optical signals (Ch11 to Ch33) inputted to respective input ports P1 to P3. As illustrated in FIG. 1, the optical signals Ch11 to Ch13, Ch21 to Ch23, and Ch31 to Ch33 are inputted to the input ports P1, P2, and P3, respectively.

Figure 3:
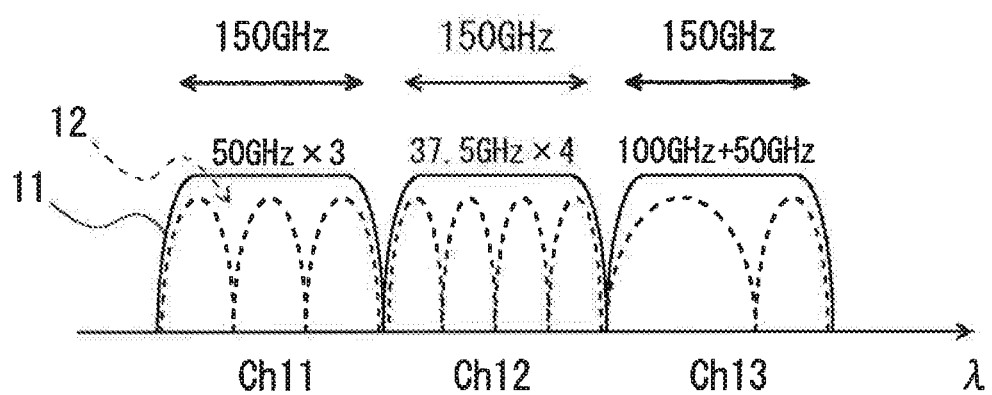
FIG. 3 is a diagram for a description of channel bandwidths used by the optical transmission device according to the first example embodiment.

The respective optical signals are constituted so that a plurality of wavelength-multiplexed signals can be allocated within one channel band (see FIG. 3). In addition, the respective optical signals are filtered in channel units. In the cyclic AWG illustrated in FIG. 1, the optical signals Ch11, Ch32, and Ch23, out of the respective optical signals (Ch11 to Ch33), are output from an output port. In this configuration, the pass-band width of each of the input ports of the cyclic AWG corresponds to the bandwidth of a channel.

That is, in the optical transmission device according to each example embodiment, expansion of the pass-band width of each of the input ports P1 to P3 of the cyclic AWG to the bandwidth of a channel enables the cyclic AWG to respectively filter the optical signals (Ch11, Ch12, Ch13, . . . , and Ch33) having a predetermined bandwidth.

The filtering capability in conjunction with a capability of arbitrarily setting the number and the bandwidths of a plurality of wavelength-multiplexed signals allocated within each channel (see FIG. 3) enables the optical transmission device to flexibly set optical signals to be transmitted. Hereinafter, the optical transmission device according to each example embodiment will be described in detail.

<First Example Embodiment>

Figure 2:
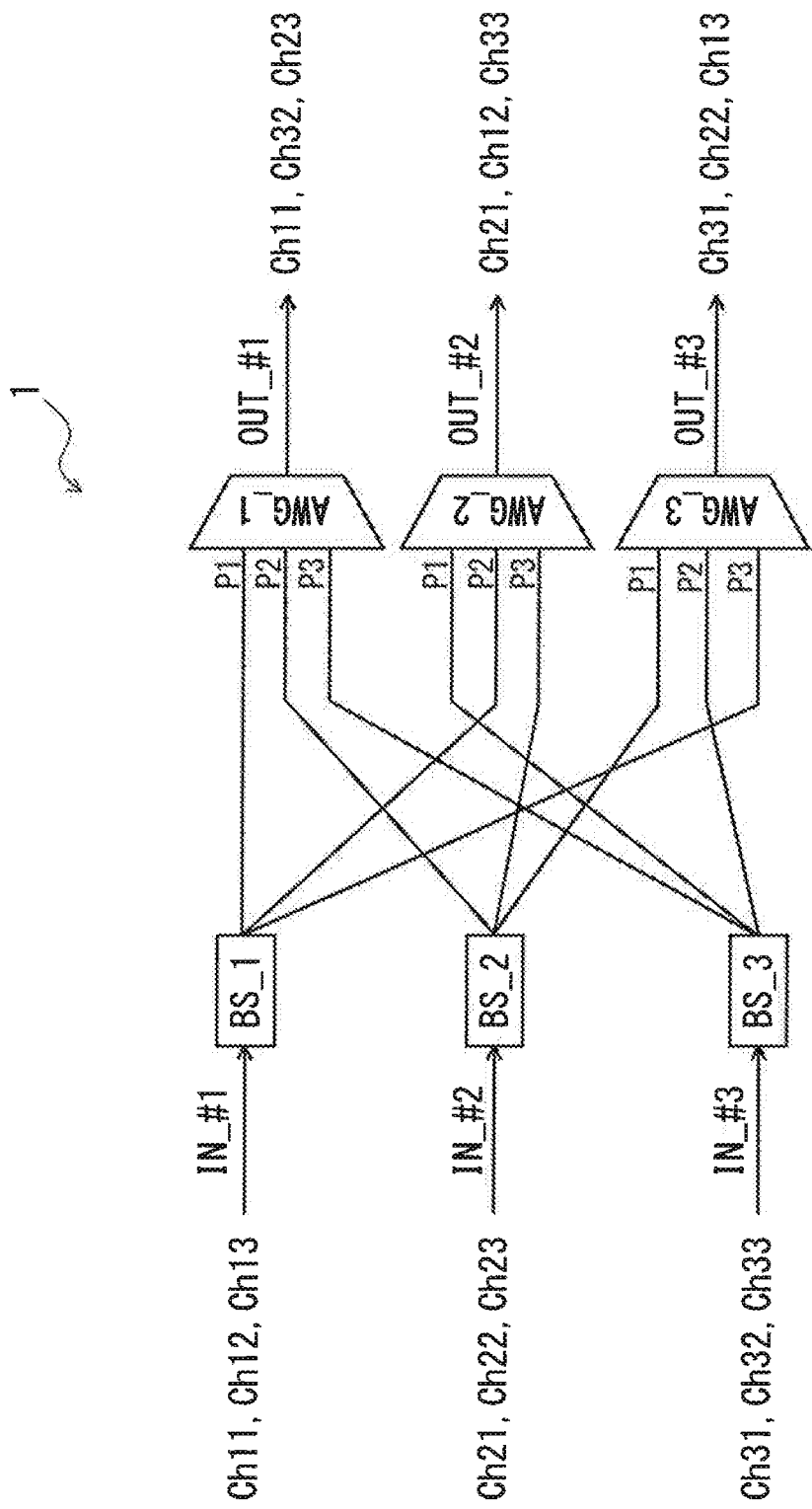
FIG. 2 is a diagram for a description of an optical transmission device according to a first example embodiment.

FIG. 2 is a diagram for a description of an optical transmission device according to a first example embodiment. As illustrated in FIG. 2, an optical transmission device 1 according to the present example embodiment is configured using a plurality of beam splitters BS_1 to BS_3 and a plurality of cyclic AWGs AWG_1 to AWG_3. The optical transmission device 1 according to the present example embodiment may be used in an optical node, and more specifically an optical cross-connect node, in an optical communication network.

As illustrated in FIG. 2, the input sides of the beam splitters BS_1 to BS_3 are connected to three input side paths IN_#1 to IN_#3, respectively. Optical signals outputted from the beam splitters BS_1 to BS_3 are supplied to the cyclic AWGs AWG_1 to AWG_3, which are arranged at the succeeding stage of the beam splitters BS_to BS_3. Each of the beam splitters BS_1 to BS_3 is a beam splitter with one input and three outputs (1×3), and each of the cyclic AWGs AWG_1 to AWG_3 is a cyclic AWG with three inputs and one output (3×1). The output ports of the cyclic AWGs AWG_1 to AWG_3 are connected to output side paths OUT_# to OUT_#3, respectively.

Each of the beam splitters BS_1 to BS_3 outputs respective optical signals that are inputted to the beam splitter to an input port of each of the cyclic AWGs AWG_1 to AWG_3. Specifically, the beam splitter BS_1 splits optical signals Ch11, Ch12, and Ch13 supplied from the input side path IN_#1 and supplies the optical signals Ch11, Ch12, and Ch13 to an input port P1 of the cyclic AWG AWG_1, an input port P2 of the cyclic AWG AWG_2, and an input port P3 of the cyclic AWG AWG_3. Similarly, the beam splitter BS_2 splits optical signals Ch21, Ch22, and Ch23 supplied from the input side path IN_#2 and supplies the optical signals Ch21, Ch22, and Ch23 to an input port P2 of the cyclic AWG AWG_1, an input port P3 of the cyclic AWG AWG_2, and an input port P1 of the cyclic AWG AWG_3. Still similarly, the beam splitter BS_3 splits optical signals Ch31, Ch32, and Ch33 supplied from the input side path IN_#3 and supplies the optical signals Ch31, Ch32, and Ch33 to an input port P3 of the cyclic AWG AWG_1, an input port P1 of the cyclic AWG AWG_2, and an input port P2 of the cyclic AWG AWG_3.

Each of the cyclic AWGs AWG_1 to AWG_3 filters (selects) respective optical signals inputted to each of the input ports P1 to P3 of the cyclic AWG and outputs the filtered optical signals to the output side path connected thereto. Specifically, the cyclic AWG AWG_1 outputs the optical signals Ch11, Ch32, and Ch23 out of the optical signals inputted to the input ports P1 to P3 thereof to the output side path OUT_#1. In addition, the cyclic AWG AWG_2 outputs the optical signals Ch21, Ch12, and Ch33 out of the optical signals inputted to the input ports P1 to P3 thereof to the output side path OUT_#2. Still in addition, the cyclic AWG AWG_3 outputs the optical signals Ch31, Ch22, and Ch13 out of the optical signals inputted to the input ports P1 to P3 thereof to the output side path OUT_#3.

In the above configuration, the respective optical signals Ch11, Ch12, and Ch13, which pass through the input side path IN_#1, are optical signals in frequency bands different from one another. The same applies to the respective optical signals Ch21, Ch22, and Ch23, which pass through the input side path IN_#2, and the respective optical signals Ch31, Ch32, and Ch33, which pass through the input side path IN_#3.

Meanwhile, since the optical signal Ch11 in the input side path IN_#1, the optical signal Ch21 in the input side path IN_#2, and the optical signal Ch31 in the input side path IN_#3 are optical signals in an identical frequency band, the optical signals are, in order to achieve WDM communication, required to be set not to be outputted to an identical output side path. Similarly, since the optical signal Ch12 in the input side path IN_#1, the optical signal Ch22 in the input side path IN_#2, and the optical signal Ch32 in the input side path IN_#3 are optical signals in an identical frequency band, the optical signals are, in order to achieve WDM communication, required to be set not to be outputted to an identical output side path. Still similarly, since the optical signal Ch13 in the input side path IN_#1, the optical signal Ch23 in the input side path IN_#2, and the optical signal Ch33 in the input side path IN_#3 are optical signals in an identical frequency band, the optical signals are, in order to achieve WDM communication, required to be set not to be outputted to an identical output side path.

In the optical transmission device 1 according to the present example embodiment, the respective optical signals (Ch11, Ch12, Ch13, . . . , and Ch33) are routed in channel units. In addition, the respective optical signals are constituted so that a plurality of wavelength-multiplexed signals can be allocated within the band of one channel.

FIG. 3 is a diagram for a description of bandwidths of channels used by the optical transmission device 1 according to the present example embodiment. As illustrated in FIG. 3, in the optical transmission device 1 according to the present example embodiment, a plurality of wavelength-multiplexed signals (optical signals) 12 can be allocated within one channel band 11. In FIG. 3, a case where the bandwidths of the respective channels Ch11, Ch12, and Ch13 are set at 150 GHz and three optical signals with a bandwidth of 50 GHz are allocated in the channel Ch11 is illustrated as an example. In addition, a case where four optical signals with a bandwidth of 37.5 GHz are allocated in the channel Ch12 is illustrated. Still in addition, a case where an optical signal with a bandwidth of 100 GHz and an optical signal with a bandwidth of 50 GHz are allocated in the channel Ch13 is illustrated. Note that the examples illustrated in FIG. 3 are just examples and the bandwidths of the respective channel bands 11 may be determined arbitrarily. Note also that the bandwidths and the number of optical signals 12 to be allocated in the band of each channel may be determined arbitrarily.

In the optical transmission device 1 according to the present example embodiment, the pass-band width of each of the input ports P1 to P3 of each of the cyclic AWGs AWG_1 to AWG_3 (that is, the bandwidth of a filter) is set so as to correspond to the bandwidth of each of the channels (Ch11, Ch12, Ch13, . . . , and Ch33). In other words, expansion of the pass-band width of each of the input ports P1 to P3 of each of the cyclic AWGs AWG_1 to AWG_3 to the bandwidth of a channel enables optical signals each having a predetermined bandwidth (that is, the channels Ch11, Ch12, Ch13, . . . , and Ch33) to be respectively filtered. For example, filtering the channel Ch11 in channel units enables three optical signals 12 each of which has a bandwidth of 50 GHz to be filtered in an identical direction.

Figure 4:
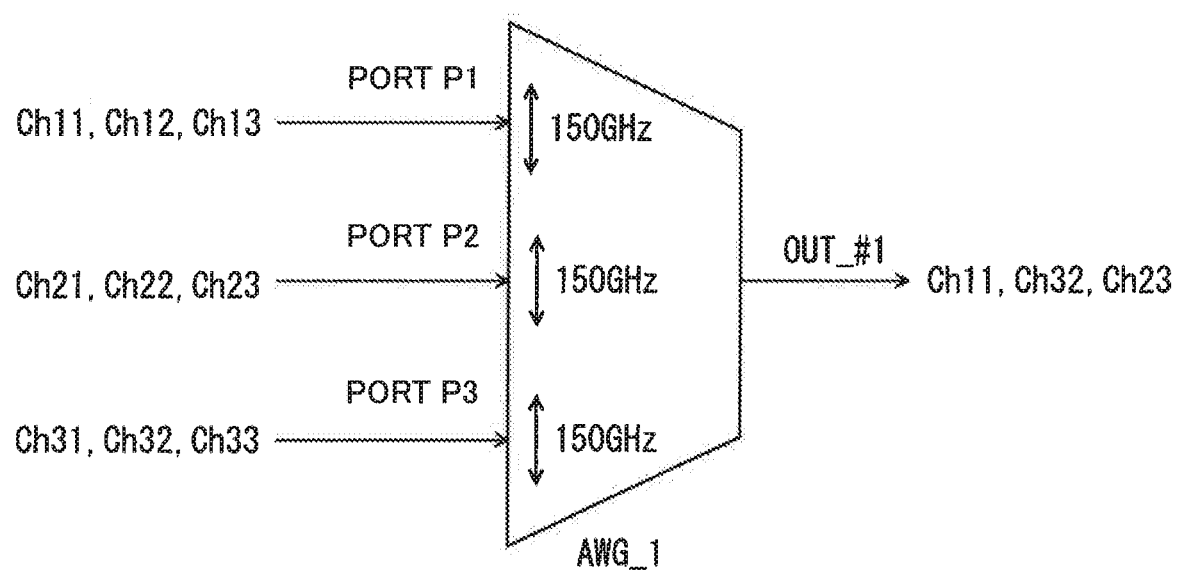
FIG. 4 is a diagram for a description of details of a cyclic AWG used by the optical transmission device according to the first example embodiment.

When described in detail using FIG. 4, for example, the optical signals Ch11, Ch12, and Ch13, Ch21, Ch22, and Ch23, and Ch31, Ch32, and Ch33 are supplied to the input ports P1, P2, and P3 of the cyclic AWG AWG_1, respectively. On this occasion, setting the pass-band width of each of the input ports P1 to P3 at 150 GHz enables an optical signal with a bandwidth per channel of 150 GHz to be filtered.

For example, making the pass band and the center frequency of the input port P1 of the cyclic AWG AWG_1 coincide with the frequency band and the center frequency of the optical signal Ch11, respectively, enables only the optical signal Ch11 out of the optical signals Ch11, Ch12, and Ch13 supplied to the input port P1 to be passed (that is, enables the optical signals Ch12 and Ch13 to be removed). Similarly, making the pass band and the center frequency of the input port P2 of the cyclic AWG AWG_1 coincide with the frequency band and the center frequency of the optical signal Ch23, respectively, enables only the optical signal Ch23 out of the optical signals Ch21, Ch22, and Ch23 supplied to the input port P2 to be passed. Still similarly, making the pass band and the center frequency of the input port P3 of the cyclic AWG AWG_1 coincide with the frequency band and the center frequency of the optical signal Ch32, respectively, enables only the optical signal Ch32 out of the optical signals Ch31, Ch32, and Ch33 supplied to the input port P3 to be passed.

On this occasion, the pass-band width and the center frequency interval of each of the input ports P1 to P3 of the cyclic AWG AWG_1 are 150 GHz and 150 GHz, respectively.

For example, the pass-band width of each of the input ports P1 to P3 of each of the cyclic AWGs AWG_1 to AWG_3 may be set at m (m is a positive real number not less than 2) times of an adjacent frequency interval of a plurality of wavelength-multiplexed signals. For example, when it is assumed that the adjacent frequency interval of wavelength-multiplexed signals is 37.5 GHz and m=4, the pass-band widths of the input ports P1 to P3 are 150 GHz (see Ch12 in FIG. 3). In this case, when it is assumed that communication with a capacity of 100 Gbps per optical signal is performed, it is possible to achieve communication with a capacity of 400 Gbps because four optical signals with a bandwidth of 37.5 GHz can be allocated within one channel.

In addition, when, for example, it is assumed that the adjacent frequency interval of wavelength-multiplexed signals is 50 GHz and m=3, the pass-band widths of the input ports P1 to P3 are 150 GHz (see Ch11 in FIG. 3). In this case, when it is assumed that communication with a capacity of 100 Gbps per optical signal is performed, it is possible to achieve communication with a capacity of 300 Gbps because three optical signals with a bandwidth of 50 GHz can be allocated within one channel. Still in addition, when, for example, it is assumed that the adjacent frequency interval of wavelength-multiplexed signals is 75 GHz and m=2, the pass-band widths of the input ports P1 to P3 are also 150 GHz. The above-described examples are just examples, and an optimal signal interval and an optimal additional bandwidth of the AWG (m times of the signal interval) are determined based on the modulation method and the capacity of involved signals.

As described above, the optical transmission device 1 according to the present example embodiment is configured so that a plurality of wavelength-multiplexed signals can be allocated within the band of one channel. In the above configuration, the number and the bandwidths of a plurality of wavelength-multiplexed signals allocated in the band of one channel may be set arbitrarily (flexible grid).

In addition, the configuration of the optical transmission device 1 according to the present example embodiment using cyclic AWGs enables the number of optical filters to be passed per node to be reduced and influence of band narrowing due to optical filters to be reduced when compared with a case where wavelength selective switches (WSS) are used.

Still in addition, the use of the cyclic AWGs AWG_1 to AWG_3 for filtering each optical signal in the optical transmission device 1 according to the present example embodiment enables signals in an identical frequency band to be avoided from being outputted to an identical output side path.

Accordingly, the invention according to the present example embodiment enables an optical transmission device to be provided that, while suppressing optical signals from being trimmed because of band narrowing due to optical filters, achieves flexibility of optical communication such as wavelength reutilization and that supports a flexible grid.

Hereinafter, advantageous effects of the present example embodiment will be described in detail.

Figure 5:
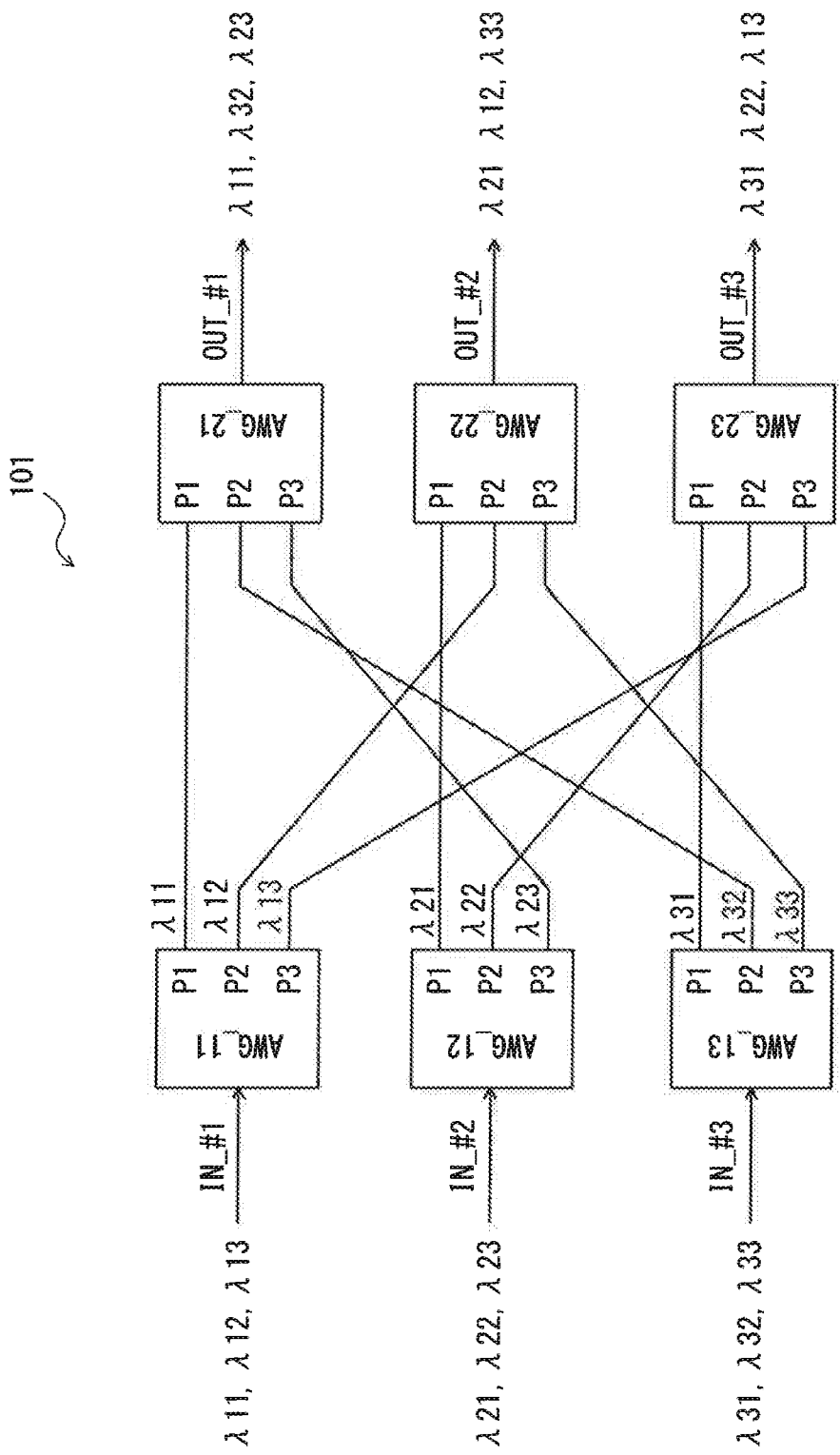
FIG. 5 is a diagram for a description of an optical transmission device according to a comparative example.

FIG. 5 is a diagram for a description of an optical transmission device according to a comparative example. As illustrated in FIG. 5, an optical transmission device 101 according to the comparative example is configured using a plurality of AWGs AWG_1 to AWG_13 that are arranged at the preceding stage and a plurality of AWGs AWG_21 to AWG_23 that are arranged at the succeeding stage. Each of the AWGs AWG_11 to AWG_13 is an AWG with one input and three outputs (1×3), and each of the AWGs AWG_21 to AWG_23 is an AWG with three inputs and one output (3×1).

The AWG AWG_11 branches optical signals λ11 to λ13 that are supplied from an input side path IN_#1 and outputs the optical signal λ11, λ12, and λ13 to a port P1 of the AWG AWG_21, a port P2 of the AWG AWG_22, and a port P3 of the AWG AWG_23, respectively. In addition, the AWG AWG_12 branches optical signals λ21 to λ23 that are supplied from an input side path IN_#2 and outputs the optical signal λ21, λ22, and λ23 to a port P1 of the AWG AWG_22, a port P2 of the AWG AWG_23, and a port P3 of the AWG AWG_21, respectively. Still in addition, the AWG AWG_13 branches optical signals λ31 to λ33 that are supplied from an input side path IN_#3 and outputs the optical signal λ31, λ32, and λ33 to a port P1 of the AWG AWG_23, a port P2 of the AWG AWG_21, and a port P3 of the AWG AWG_22, respectively.

The AWG AWG_21 multiplexes and outputs the optical signals λ11, λ32, and λ23 that are supplied to the ports P1, P2, and P3, respectively, to an output side path OUT_#1. In addition, the AWG AWG_22 multiplexes and outputs the optical signals λ21, λ12, and λ33 that are supplied to the ports P1, P2, and P3, respectively, to an output side path OUT_#2. Still in addition, the AWG AWG_23 multiplexes and outputs the optical signals λ31, λ22, and λ13 that are supplied to the ports P1, P2, and P3, respectively, to an output side path OUT_#3.

Figure 6:
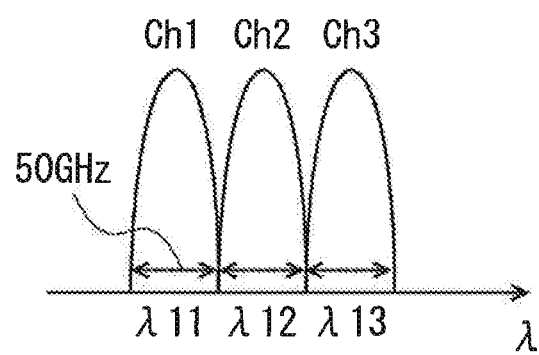
FIG. 6 is a diagram for a description of channel bandwidths used by the optical transmission device according to the comparative example.

FIG. 6 is a diagram for a description of bandwidths of channels used by the optical transmission device according to the comparative example. As illustrated in FIG. 6, in the optical transmission device 101 according to the comparative example, one optical signal is allocated to one channel. That is, to a channel Ch1, one optical signal λ11 (with a bandwidth of 50 GHz) is allocated. Similarly, to channels Ch2 and Ch3, the optical signals λ12 and λ13 are allocated, respectively. The same applies to the other optical signals λ21 to λ23 and λ31 to λ33.

That is, in the optical transmission device 101 according to the comparative example, channels have a one-on-one correspondence with optical signals, and, thus, a relationship between each of optical signals supplied to the input side paths IN_#1 to IN_#3 and each of optical signals outputted from the output side paths OUT_#1 to OUT_#3 is determined uniquely. In other words, a relationship between each of optical signals supplied to the input side paths IN_#1 to IN_#3 and each of optical signals outputted from the output side paths OUT_#1 to OUT_#3 is fixed. Therefore, there has been a problem in that the optical transmission device 101 cannot support a flexible grid.

By contrast, in the optical transmission device 1 according to the present example embodiment, the device is configured in such a manner that a plurality of wavelength-multiplexed signals can be allocated within the band of one channel and, further, the pass-band width of each of the input ports of a cyclic AWG is expanded so that the cyclic AWG is able to filter optical signals in channel units. This configuration enables the number and the bandwidths of a plurality of wavelength-multiplexed signals allocated in each channel to be set arbitrarily, which enables optical signals that are to be transmitted to be set flexibly. That is, since, as illustrated in FIG. 3, the number of optical signals allocated within one channel can be varied (see the channels Ch11 and Ch12) and optical signals with bandwidths different from each other can be allocated within one channel (see the channel Ch13), optical signals to be transmitted may be set flexibly.

In addition, in the optical transmission device 101 illustrated in FIG. 5, the configuration including two stages of AWGs causes the number of filters that respective optical signals pass to be larger than that in the optical transmission device 1 illustrated in FIG. 2. For this reason, influence of band narrowing due to optical filters increases. Means for reducing the number of filters include, for example, a configuration using an N×M AWG, which is disclosed in FIG. 2 in NPL 1. However, since overlapping of pass bands between filters as described in a second example embodiment, which will be described later, cannot be achieved due to the principle of the AWG, influence of band narrowing due to optical filters cannot be minimized.

A CDC-ROADM is a system with high flexibility because the CDC-ROADM uses active WSSes. However, due to the CDC-ROADM using WSSes, the number of optical filters to be passed per node increases and influence of band narrowing due to optical filters becomes large.

By contrast, in the optical transmission device 1 according to the present example embodiment, since the number of stages at which cyclic AWGs used therein are arranged is one, the number of filters that respective optical signals pass may be set smaller than that in the optical transmission device 101 according to the comparative example illustrated in FIG. 5. In addition, since no WSS is used in the optical transmission device 1 according to the present example embodiment, influence of band narrowing due to the optical filters may be reduced.

The invention according to the present example embodiment, which has been described thus far, enables an optical transmission device to be provided that, while suppressing optical signals from being trimmed because of band narrowing due to optical filters, achieves flexibility of optical communication such as wavelength reutilization and that supports a flexible grid.

Note that, as to the optical transmission device 1 illustrated in FIG. 2, a case where both the number of input side paths and the number of output side paths were three was described as an example. However, in the optical transmission device according to the present example embodiment, the number of input side paths and the number of output side paths may be a number other than three. That is, in the case of a configuration including n (n is a natural number not less than 2) input side paths IN_#1 to IN_#n and n output side paths OUT_#1 to OUT_#n, n beam splitters BS_1 to BS_n (each thereof is a beam splitter with one input and n outputs) that are connected to the input side paths IN_#1 to IN_#n, respectively, are arranged. In addition, n cyclic AWGs AWG_1 to AWG_n (each thereof is a cyclic AWG with n inputs and one output) are arranged at the succeeding stage of the n beam splitters BS_1 to BS_n. Each of the n beam splitters BS_1 to BS_n outputs respective optical signals that are inputted to the beam splitter to an input port of each of the n cyclic AWGs AWG_1 to AWG_n. Each of the n cyclic AWGs AWG_1 to AWG_n filters respective optical signals inputted to each of the input ports of the cyclic AWG and outputs the filtered optical signals to the output side path connected thereto. This operation causes optical signals after filtering to be outputted from the respective cyclic AWGs AWG_1 to AWG_n to the output side paths OUT_#1 to OUT_#n.

Figure 7:
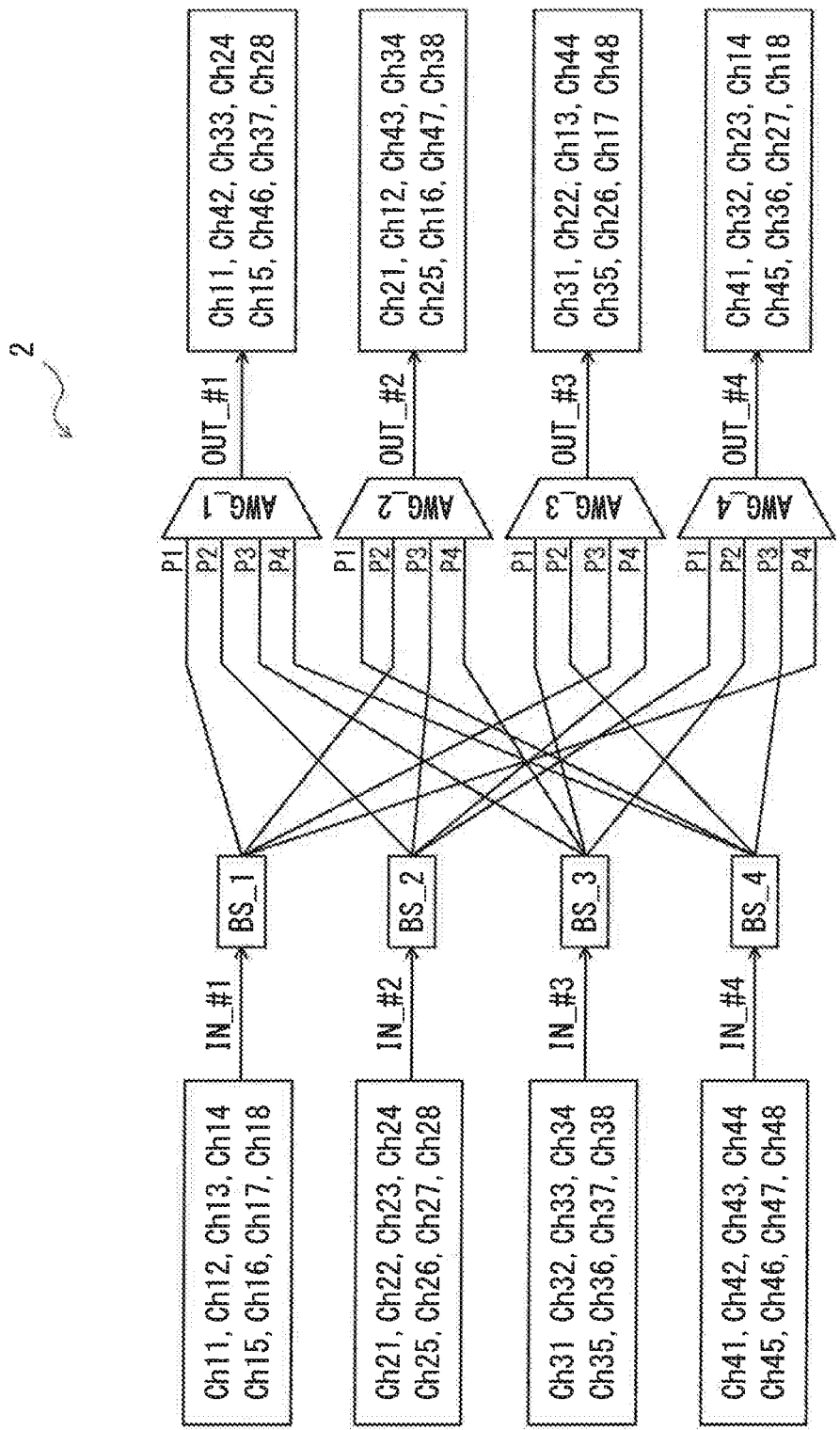
FIG. 7 is a diagram for a description of another configuration example of the optical transmission device according to the first example embodiment.

FIG. 7 is a diagram for a description of another configuration example of the optical transmission device according to the present example embodiment. In an optical transmission device 2 illustrated in FIG. 7, a configuration when the value of the above-described n is set as n=4 is illustrated. As illustrated in FIG. 7, the input sides of beam splitters BS_1 to BS_4 are connected to four input side paths IN_#1 to IN_#4, respectively. Optical signals outputted from the beam splitters BS_1 to BS_4 are supplied to cyclic AWGs AWG_1 to AWG_4, which are arranged at the succeeding stage of the beam splitters BS_1 to BS_4. Each of the beam splitters BS_1 to BS_4 is a beam splitter with one input and four outputs (1×4), and each of the cyclic AWGs AWG_1 to AWG_4 is a cyclic AWG with four inputs and one output (4×1). The output ports of the cyclic AWGs AWG_1 to AWG_4 are connected to output side paths OUT_#1 to OUT_#4, respectively.

Each of the beam splitters BS_1 to BS_4 outputs respective optical signals that are inputted to the beam splitter to an input port of each of the cyclic AWGs AWG_1 to AWG_4. Specifically, the beam splitter BS_1 splits optical signals Ch11 to Ch18 supplied from the input side path IN_#1. The beam splitter BS_1 supplies the split optical signals Ch11 to Ch18 to an input port P1 of the cyclic AWG AWG_1, an input port P2 of the cyclic AWG AWG_2, an input port P3 of the cyclic AWG AWG_3, and an input port P4 of the cyclic AWG AWG_4.

Similarly, the beam splitter BS_2 splits optical signals Ch21 to Ch28 supplied from the input side path IN_#2. The beam splitter BS_2 supplies the split optical signals Ch21 to Ch28 to an input port P2 of the cyclic AWG AWG_1, an input port P3 of the cyclic AWG AWG_2, an input port P4 of the cyclic AWG AWG_3, and an input port P1 of the cyclic AWG AWG_4.

Still similarly, the beam splitter BS_3 splits optical signals Ch31 to Ch38 supplied from the input side path IN_#3. The beam splitter BS_3 supplies the split optical signals Ch31 to Ch38 to an input port P3 of the cyclic AWG AWG_1, an input port P4 of the cyclic AWG AWG_2, an input port P1 of the cyclic AWG AWG_3, and an input port P2 of the cyclic AWG AWG_4.

Still similarly, the beam splitter BS_4 splits optical signals Ch41 to Ch48 supplied from the input side path IN_#4. The beam splitter BS_4 supplies the split optical signals Ch41 to Ch48 to an input port P4 of the cyclic AWG AWG_1, an input port P1 of the cyclic AWG AWG_2, an input port P2 of the cyclic AWG AWG_3, and an input port P3 of the cyclic AWG AWG_4.

Each of the cyclic AWGs AWG_1 to AWG_4 filters respective optical signals inputted to each of the input ports of the cyclic AWG and outputs the filtered optical signals to the output side path connected thereto. Optical signals outputted from each of the cyclic AWGs AWG_1 to AWG_4 to one of the output side paths OUT_#1 to OUT_#4 connected to the cyclic AWG are as illustrated in FIG. 7.

In the optical transmission device 2 illustrated in FIG. 7, the respective optical signals Ch11 to Ch18, which pass through the input side path IN_#1, are also optical signals in frequency bands different from one another. The same applies to the respective optical signals Ch21 to Ch28, which pass through the input side path IN_#2, the respective optical signals Ch31 to Ch38, which pass through the input side path IN_#3, and the respective optical signals Ch41 to Ch48, which pass through the input side path IN_#4.

In addition, in the optical transmission device 2 illustrated in FIG. 7, the respective optical signals (Ch11, Ch12, Ch13, . . . , and Ch48) are also filtered in channel units. The respective optical signals are constituted so that a plurality of wavelength-multiplexed signals can be allocated within the band of one channel (see FIG. 3). In this case, the bandwidths of respective channels may also be determined arbitrarily.

Further, the bandwidths and the number of optical signals to be allocated in the band of each channel may also be determined arbitrarily.

<Second Example Embodiment>

Next, a second example embodiment of the present invention will be described.

Figure 8:
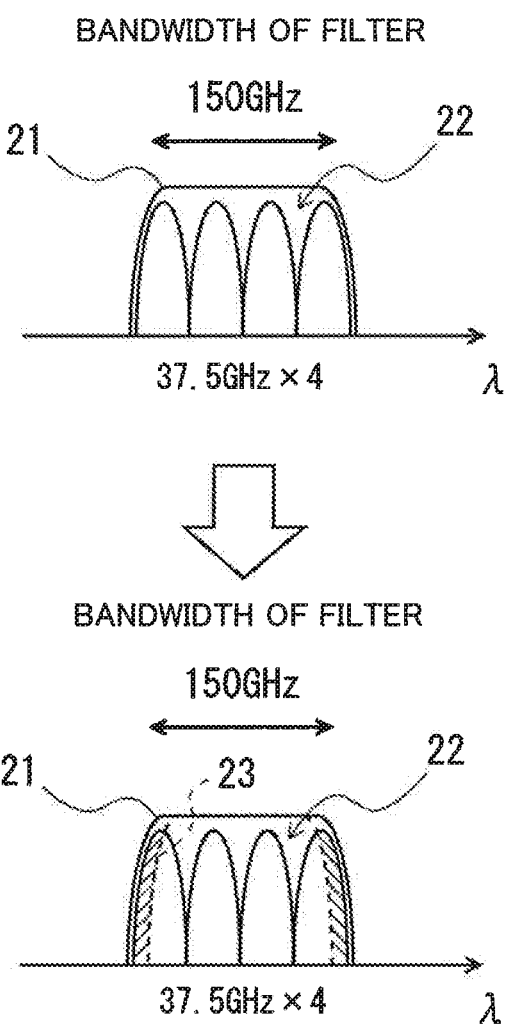
FIG. 8 is a diagram for a description of a problem in a second example embodiment.

First, another problem related to the invention according to the present example embodiment will be described using FIG. 8. In the optical transmission device 1 described in the first example embodiment, a plurality of wavelength-multiplexed signals are allocated within the band of one channel (see FIG. 3). In order to transmit optical signals with high density (a high accommodation rate) on this occasion, it is preferable that, as illustrated in the upper drawing in FIG. 8, there be no difference between a filter bandwidth 21 and a bandwidth of four optical signals 22 (that is, a bandwidth per channel). In the case illustrated in the upper drawing in FIG. 8, for example, since the bandwidth of one optical signal 22 is 37.5 GHz and the number of the optical signals 22 is four, the bandwidth of the four optical signals 22 (bandwidth per channel) becomes 37.5 GHz×4=150 GHz. In this case, setting the filter bandwidth 21 at 150 GHz enables optical signals to be transmitted with high density.

However, since the shape of an optical filter is not rectangular and there is individual variation in the center frequency and the bandwidth of each optical filter, the bandwidth of filters viewed at the receiving end becomes narrower (band narrowing) as the number of filters increases. Such a characteristic of filters causes optical signals to be trimmed at both ends of the frequency band thereof and to lose some signal components therein during a transmission process, and, eventually, signal errors increase at the receiving end, which disables reception of signals. Explaining specifically, as illustrated in the lower drawing in FIG. 8, when multiple stages of filters are concatenated, the filter bandwidth (150 GHz) 21 becomes narrow as indicated by a reference sign 23. As a result of the phenomenon, there occurs a case where, since signals at both ends out of four optical signals 22 are trimmed (portions that are trimmed off are indicated by hatching), the level of the signals at both ends is decreased to a level at which the signals cannot be received.

Setting gap areas (that is, guard bands) between optical signals and both ends of the filter band in order to suppress such a phenomenon is conceivable. In this case, however, there is a problem in that the accommodation rate for optical signals is reduced by as much as the width of the set guard bands.

In order to solve such a problem, the optical transmission device according to the present example embodiment is configured in such a way that portions of the pass bands (that is, filter bands) of respective adjacent input ports of a cyclic AWG overlap each other. Explaining by use of a specific example, the optical transmission device is configured in such a way that a portion of the pass band of the port P1 and a portion of the pass band of the port P2 of the cyclic AWG AWG_1 illustrated in FIG. 4 overlap each other as pass bands 31_1 and 31_2 illustrated in FIG. 9 do (that is, an overlapping area 35 is set). In addition, the optical transmission device is configured in such a way that a portion of the pass band of the port P2 and a portion of the pass band of the port P3 of the cyclic AWG AWG_1 illustrated in FIG. 4 overlap each other as pass bands 31_2 and 31_3 illustrated in FIG. 9 do (that is, an overlapping area 36 is set).

For example, expanding the pass-band width of each of the input ports of a cyclic AWG while maintaining a frequency interval(s) between adjacent input ports thereof enables portions of the pass bands of the respective adjacent input ports to overlap each other.

The pass bands of the respective input ports of the cyclic AWG may be expanded so that an overlapping area(s) exist(s) between the pass bands of adjacent input ports by, for example, adjusting the shapes of input and output waveguides of the cyclic AWG. For example, the pass band of each input port of the cyclic AWG can be expanded by adjusting the shapes of a coupling portion between an input waveguide and a slab waveguide on the input side and a coupling portion between a slab waveguide on the output side and an output waveguide of the cyclic AWG.

Figure 9:
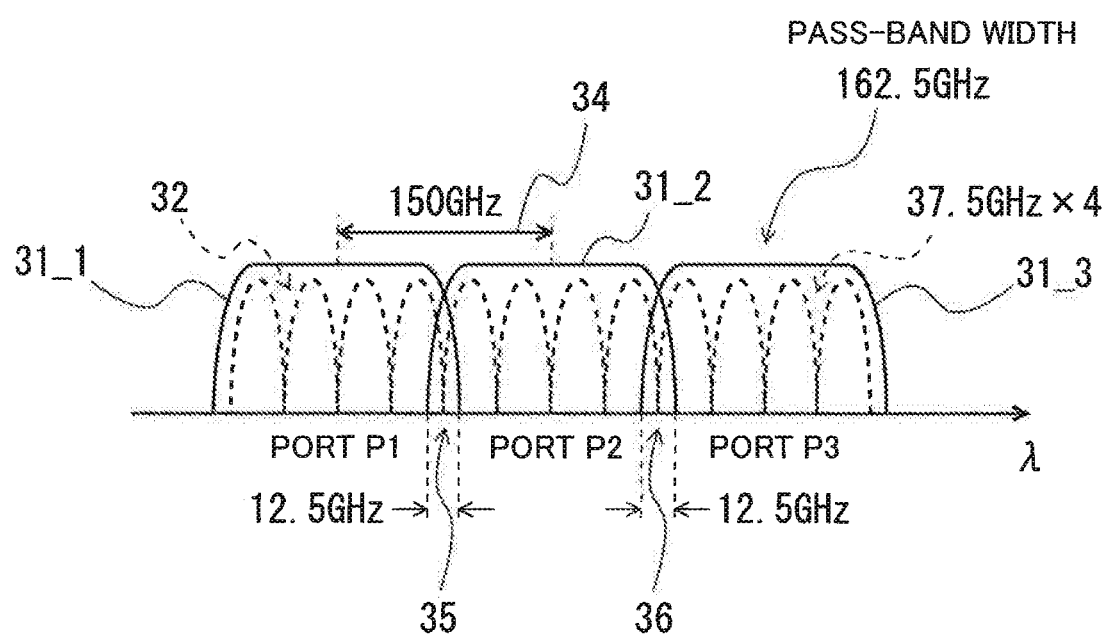
FIG. 9 is a diagram for a description of pass-band widths of a cyclic AWG that an optical transmission device according to the second example embodiment includes.

Explaining by use of a specific example, as illustrated in FIG. 9, while a frequency interval 34 is maintained at 150

GHz, the width of each of the pass bands 31_1 to 31_3 of the respective ports P1 to P3 is expanded from 150 GHz to 162.5 GHz. Setting the frequency interval and the pass-band width as described above enables a portion of the pass band 31_1 of the input port P1 and a portion of the pass band 31_2 of the input port P2 to overlap each other. In this case, the width of the overlapping area 35 where the pass band 31_1 of the input port P1 and the pass band 31_2 of the input port P2 overlap each other becomes 12.5 GHz. In addition, setting the frequency interval and the pass-band width as described above enables a portion of the pass band 31_2 of the input port P2 and a portion of the pass band 31_3 of the input port P3 to overlap each other. In this case, the width of the overlapping area 36 where the pass band 31_2 of the input port P2 and the pass band 31_3 of the input port P3 overlap each other becomes 12.5 GHz.

As described above, the optical transmission device according to the present example embodiment is configured in such a way that the pass bands 31_1 to 31_3 overlap each other between adjacent input ports of the cyclic AWG. Accordingly, optical signals 32 may be suppressed from being trimmed at both ends of the frequency band thereof during a transmission process of the optical signals 32 and an optical signal that cannot be received may be suppressed from occurring. Therefore, transmission characteristics may be suppressed from deteriorating. Meanwhile, although making pass bands overlap each other between adjacent input ports causes an optical signal to one input port of the adjacent input ports to leak into the other input port and crosstalk to occur, optimizing overlapping width between filters through a comparison between filter band narrowing and crosstalk so that deterioration of optical signals is minimized enables best transmission characteristics to be obtained.

The whole or part of the example embodiments disclosed above can be described as, but not limited to, the following supplementary notes.

(Supplementary Note 1)

An optical transmission device comprising a cyclic AWG that filters respective optical signals inputted to each input port, wherein the respective optical signals are constituted so that a plurality of wavelength-multiplexed signals can be allocated within one channel band, the respective optical signals are filtered in channel units, and pass-band width of each of the input ports of the cyclic AWG corresponds to bandwidth of each of the channels.

(Supplementary Note 2)

The optical transmission device according to supplementary note 1, wherein pass-band width of each of the input ports of the cyclic AWG is set at m (m is a positive real number not less than 2) times of an adjacent frequency interval of the plurality of wavelength-multiplexed signals.

(Supplementary Note 3)

The optical transmission device according to supplementary note 2, wherein pass-band width of each of the input ports of the cyclic AWG is 150 GHz, and a center frequency interval of the input ports is 150 GHz.

(Supplementary Note 4)

The optical transmission device according to supplementary note 3, wherein the adjacent frequency interval is 37.5 GHz, and a value of the m is 4.

(Supplementary Note 5)

The optical transmission device according to supplementary note 3, wherein the adjacent frequency interval is 50 GHz, and a value of the m is 3.

(Supplementary Note 6)

The optical transmission device according to supplementary note 3, wherein the adjacent frequency interval is 75 GHz, and a value of the m is 2.

(Supplementary Note 7)

The optical transmission device according to any one of supplementary notes 1 to 6 comprising:

n (n is a natural number not less than 2) beam splitters each of which is connected to one of n input side paths; and n cyclic AWGs that are arranged at a succeeding stage of the n beam splitters, wherein each of the n beam splitters outputs respective optical signals that are inputted to the beam splitter to one of the input ports of each of the n cyclic AWGs, each of the n cyclic AWGs is a cyclic AWG with n inputs and one output, and each of the n cyclic AWGs filters the respective optical signals inputted to each of the input ports and outputs the filtered optical signals to an output side path.

(Supplementary Note 8)

The optical transmission device according to any one of supplementary notes 1 to 7, wherein portions of pass bands of respective adjacent input ports of the cyclic AWG overlap each other.

(Supplementary Note 9)

The optical transmission device according to supplementary note 8, by expanding pass-band width of each of the input ports of the cyclic AWG while maintaining a frequency interval between the adjacent input ports of the cyclic AWG, making portions of pass bands of the respective adjacent input ports overlap each other.

(Supplementary Note 10)

A transmission method of optical signals comprising, with respect to each of input ports of a cyclic AWG in which pass-band width of each of the input ports corresponds to bandwidth of each channel:

inputting a plurality of channels of wavelength-multiplexed signals where a plurality of optical signals are wavelength-multiplexed within a band of each of the channels; and filtering and outputting the wavelength-multiplexed signals in channel units.

(Supplementary Note 11)

The transmission method of optical signals according to supplementary note 10, wherein pass-band width of each of the input ports of the cyclic AWG is set at m (m is a positive real number not less than 2) times of an adjacent frequency interval of the plurality of wavelength-multiplexed signals.

(Supplementary Note 12)

The transmission method of optical signals according to supplementary note 10 or 11 comprising:

outputting the wavelength-multiplexed signals inputted to each of n (n is a natural number not less than 2) beam splitters each of which is connected to one of n input side paths to one of the input ports of each of n cyclic AWG with n inputs and one output; and filtering the wavelength-multiplexed signals inputted to each of the input ports and outputting the filtered optical signals to an output side path.

(Supplementary Note 13)

The transmission method of optical signals according to any one of supplementary notes 10 to 12, wherein
portions of pass bands of respective adjacent input ports of the cyclic AWG overlap each other.

(Supplementary Note 14)

The transmission method of optical signals according to supplementary note 13 comprising,
by expanding pass-band width of each of the input ports of the cyclic AWG while maintaining a frequency interval between the adjacent input ports of the cyclic AWG, making portions of pass bands of the respective adjacent input ports overlap each other.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-38162, filed on Feb. 29, 2016, the disclosure of which is incorporated herein in its entirety by reference.

REFERENCE SIGNS LIST 1, 2 Optical transmission device
11 Channel band
12 Wavelength-multiplexed signal
21 Filter bandwidth
22 Optical signal
31_1 to 31_3 Pass band (filter band)
32 Optical signal
34 Frequency interval
35, 36 Overlapping area

The invention claimed is:

1. An optical transmission device comprising
a cyclic arrayed waveguide grating (AWG) that filters a plurality of optical signals respectively inputted to a plurality of input ports of the cyclic AWG,
wherein the plurality of optical signals are arranged so that a plurality of wavelength-multiplexed signals being allocated within one channel band,
the plurality of optical signals are filtered in channel units,
pass-band width of each of the plurality of input ports of the cyclic AWG corresponds to a bandwidth of a channel of a plurality of channels, and
pass-band width of each of the plurality of input ports of the cyclic AWG is set at m times of an adjacent frequency interval of the plurality of wavelength-multiplexed signals, where m is a positive real number not less than 2.

2. The optical transmission device according to claim 1, wherein
pass-band width of each of the plurality of input ports of the cyclic AWG is 150 GHz, and a center frequency interval of the plurality of input ports is 150 GHz.

3. The optical transmission device according to claim 2, wherein the adjacent frequency interval is 37.5 GHz, and a value of them is 4.

4. The optical transmission device according to claim 2, wherein the adjacent frequency interval is 50 GHz, and a value of the m is 3.

5. The optical transmission device according to claim 2, wherein the adjacent frequency interval is 75 GHz, and a value of them is 2.

6. The optical transmission device according to claim 1 comprising:
n (n is a natural number not less than 2) beam splitters each of which is connected to one of n input side paths; and
n cyclic AWGs, including the cyclic AWG, that are arranged at a succeeding stage of the n beam splitters,
wherein each of the n beam splitters outputs respective optical signals that are inputted to the beam splitter to one of n input ports of each of the n cyclic AWGs,
each of the n cyclic AWGs is a cyclic AWG with n inputs and one output, and
each of the n cyclic AWGs filters the respective optical signals inputted to each of the n input ports and outputs filtered optical signals to an output side path.

7. The optical transmission device according to claim 1, wherein
portions of pass bands of two adjacent input ports of the plurality of input ports of the cyclic AWG overlap each other.

8. The optical transmission device according to claim 7, wherein
the overlap of the portions of the pass bands of the two adjacent input ports of the plurality of input ports of the cyclic AWG is achieved by expanding pass-band width of each of the plurality of input ports of the cyclic AWG while maintaining a frequency interval between the two adjacent input ports of the cyclic AWG.

9. A transmission method of optical signals, wherein bandwidths of a plurality of channels respectively correspond to pass-band widths of a plurality of input ports of a cyclic AWG, the method comprising:
inputting the plurality of channels of wavelength-multiplexed signals where a plurality of optical signals are wavelength-multiplexed within a band of each of the plurality of channels; and
filtering and outputting the wavelength-multiplexed signals in channel units,
wherein a pass-band width of each of the plurality of input ports of the cyclic AWG is set at m times of an adjacent frequency interval of the plurality of wavelength-multiplexed signals, where m is a positive real number not less than 2.

10. The transmission method of optical signals according to claim 9, further comprising:
outputting the wavelength-multiplexed signals inputted to each of n (n is a natural number not less than 2) beam splitters each of which is connected to one of n input side paths to one of the plurality of input ports of each of n cyclic AVVGs with n inputs and one output; and
filtering the wavelength-multiplexed signals inputted to each of the input ports and outputting the filtered optical signals to an output side path.

11. The transmission method of optical signals according to claim 9, wherein
portions of pass bands of two adjacent input ports of the plurality of input ports of the cyclic AWG overlap each other.

12. The transmission method of optical signals according to claim 11, further comprising
expanding pass-band width of each of the plurality of input ports of the cyclic AWG while maintaining a frequency interval between the two adjacent input ports of the cyclic AWG so that portions of pass bands of the two adjacent input ports of the plurality of input ports overlap each other.

13. An optical transmission device comprising:
n beam splitters each of which is connected to one of n input side paths, where n is a natural number not less than 2; and
n cyclic AWGs that are arranged at a succeeding stage of the n beam splitters, wherein:
each of the n beam splitters outputs a plurality of optical signals each corresponding one of n input ports of each of the n cyclic AWGs,
each of the n cyclic AWGs is a cyclic AWG with n inputs and one output,
each of the n cyclic AWGs filters n optical signals respectively inputted to the n input ports and outputs filtered optical signal to an output side path,
in each of the n cyclic AWG, the n optical signals are arranged so that a plurality of wavelength-multiplexed signals being allocated within one channel band,
the n optical signals are filtered in channel units, and
a pass-band width of each of the n input ports corresponds to a bandwidth of a channel of a plurality of channels, wherein:
portions of pass bands of two adjacent input ports of the n input ports of each of the n cyclic AWGs overlap each other, and
the overlap of the portions of the pass bands of the two adjacent input ports of the n input ports of each of the n cyclic AWGs is achieved by expanding pass-band width of each of the n input ports of each of the n cyclic AWGs while maintaining a frequency interval between the two adjacent input ports of each of the n cyclic AWGs.

* * * * *

UNITED STATES PATENT AND TRADEMARK OFFICE
CERTIFICATE OF CORRECTION

PATENT NO. : 10,659,165 B2
APPLICATION NO. : 16/078912
DATED : May 19, 2020
INVENTOR(S) : Matsuyama et al.

Page 1 of 1

It is certified that error appears in the above-identified patent and that said Letters Patent is hereby corrected as shown below:

In the Claims

Claim 3, Column 13, Line 61, "value of them is 4" should read --value of the m is 4--.

Claim 5, Column 13, Line 67, "value of them is 2" should read --value of the m is 2--.

Claim 10, Column 14, Line 51, "AVVGs" should read --AWGs--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*